United States Patent
Hellerstein

(12) 
(10) Patent No.: US 6,704,721 B1
(45) Date of Patent: Mar. 9, 2004

(54) SYSTEMS AND METHODS FOR AUTOMATED NAVIGATION BETWEEN DYNAMIC DATA WITH DISSIMILAR STRUCTURES

(75) Inventor: Joseph L. Hellerstein, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/285,639

(22) Filed: Apr. 2, 1999

(51) Int. Cl.$^7$ .............................................. G06F 17/30
(52) U.S. Cl. ................................ 707/3; 707/3; 707/10; 707/101; 707/102
(58) Field of Search ............................... 707/1, 2, 3, 4, 707/5, 10, 101, 103, 103 R, 104 R; 709/224; 345/431, 355; 705/28

(56) References Cited

U.S. PATENT DOCUMENTS

| | | | | |
|---|---|---|---|---|
| 4,310,883 A | * | 1/1982 | Clifton et al. | 707/205 |
| 4,855,907 A | * | 8/1989 | Ferro, Jr. et al. | 707/204 |
| 5,627,972 A | * | 5/1997 | Shear | 709/246 |
| 5,930,784 A | * | 7/1999 | Hendrickson | 707/2 |
| 5,970,490 A | * | 10/1999 | Morgenstern | 707/10 |
| 5,987,468 A | * | 11/1999 | Singh et al. | 707/100 |
| 6,016,501 A | * | 1/2000 | Martin et al. | 707/6 |
| 6,026,397 A | * | 2/2000 | Sheppard | 707/5 |
| 6,167,391 A | * | 12/2000 | Lawrence | 707/103 R |
| 6,182,060 B1 | * | 1/2001 | Hedgcock et al. | 707/1 |
| 6,189,015 B1 | * | 2/2001 | Reed et al. | |
| 6,205,444 B1 | * | 3/2001 | Floratos et al. | 707/6 |
| 6,263,334 B1 | * | 7/2001 | Fayyad et al. | 707/5 |
| 6,282,318 B1 | * | 8/2001 | Dietrich et al. | 382/209 |
| 6,289,354 B1 | * | 9/2001 | Aggarwal et al. | 707/104 |
| 6,295,533 B2 | * | 9/2001 | Cohen | 707/5 |
| 6,330,564 B1 | * | 12/2001 | Hellerstein et al. | 707/101 |
| 6,421,670 B1 | * | 7/2002 | Fourman | 707/10 |
| 6,507,840 B1 | * | 1/2003 | Ioannidis et al. | 707/4 |
| 6,629,097 B1 | * | 9/2003 | Keith | 707/2 |
| 6,636,853 B1 | * | 10/2003 | Stephens, Jr. | 707/3 |

OTHER PUBLICATIONS

FastMap: A Fast Algorithm for Indexing, Data–Mining and Visualization of Traditional and Multimedia datasets— Christos Faloutsos and King–Ip (david) Lin—1995—ACM (pps: 163–174).*

R.F. Berry and J.L. Hellerstein, "A Flexible and Scalable Approach to Navigating Measurement Data in Performance Management Applications," Second IEEE Conference on Systems Management, Toronto, Canada, pp. 1–12, Jun., 1996.

R. Kimbell, "The Data Warehouse Toolkit," John Wiley and Sons, pp. 1–19, 1996.

M.T. Ozsu and P. Valduriez, "Principles of Distributed Database Systems," Prentice Hall, pp. 78–89, 1991.

S.B. Navathe, R. Elmasri, "A Theory of Attribute Equivalence in Databases with Application to Schema Integration," IEEE Transactions on Software Engineering, vol. 15, No. 4, pp. 449–463, Apr. 1989.

* cited by examiner

Primary Examiner—Kim Vu
Assistant Examiner—Anh Ly
(74) Attorney, Agent, or Firm—Gail H. Zarick; Ryan, Mason & Lewis, LLP

(57) ABSTRACT

Systems and methods are provided for automating navigation between dynamic data that has dissimilar structures, such as navigating between relational tables that have only a subset of their columns in common. That is, given a source dataset and source element collection, we want to navigate to an element collection in one or more target datasets. The automated navigation system includes an inter-dataset navigation engine that determines the best matching element collection within a plurality of target datasets. One method employed includes finding a descriptor of the target element collection in a target dataset. Then, a distance metric is computed between each source and target element. Lastly, a list that contains an entry for each target dataset along with its associated target element collection and distance value is output for use in a particular analysis task.

27 Claims, 3 Drawing Sheets

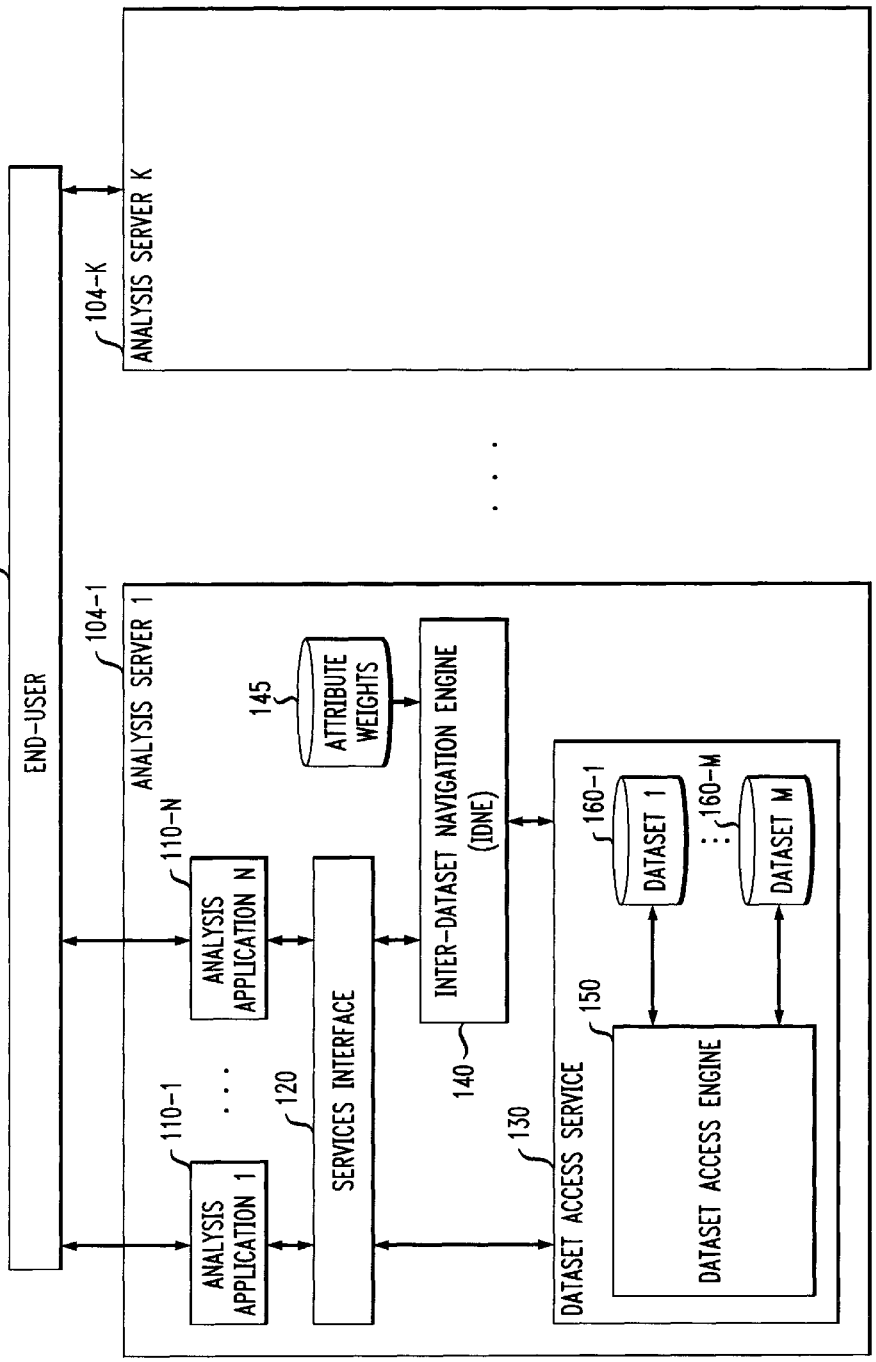

| DATASET NAME | COLLECTION DESCRIPTOR | DISTANCE |
|---|---|---|
|  |  |  |
| MVS MONITOR 3 | SHIFT=1 HOUR=8, | 2 |
|  | SUBNET=9.2.15 |  |
|  | DIV=25 DEPT=MVXD |  |
|  | EFF |  |
|  |  |  |
| UNIX ACCOUNTING | SHIFT=1 HOUR=8, | 4 |
|  | , |  |
|  | DIV=25 |  |
|  | CPU |  |
|  |  |  |
| FINANCIALS | , | 5 |
|  | , |  |
|  | DIV=25 DEPT=MVXD |  |
|  | REVENUE |  |

SYSTEMS AND METHODS FOR AUTOMATED NAVIGATION BETWEEN DYNAMIC DATA WITH DISSIMILAR STRUCTURES

FIELD OF THE INVENTION

The present invention relates generally to automating data analysis tasks and, more particularly, to analysis tasks that require navigation between dynamic data that has dissimilar structures.

BACKGROUND OF THE INVENTION

The present invention provides for systems and methods for automatically navigating between dynamic data that has dissimilar structures. The term "dynamic" as used herein refers to frequent change with respect to data, a characteristic that affects the efficiency of navigation techniques. The term "dissimilar structure" as used herein refers to a data structure containing information that is not present in another data structure. Thus, it is said that the first data structure is dissimilar with respect to the second data structure. A problem in the management of distributed systems is described below to illustrate the prior art background. However, it is to be appreciated that the invention has broader applications.

Rapid improvements in both hardware and software have dramatically changed the cost structure of information systems. Today, hardware and software account for a small fraction of these costs, typically less than 20 percent (and declining). The remaining costs relate to the management of information systems, such as software distribution, providing help desk support, and managing quality of service (QoS).

Decision support is critical to the management of information systems. For example, in software distribution, we need to know: (i) which machines require software upgrades; (ii) what are the constraints on scheduling upgrades; and (iii) the progress of upgrades once installation has begun. In QoS management, decision support detects QoS degradations, identifies resource bottlenecks, and plans hardware and software acquisitions to meet future QoS requirements.

Accomplishing these tasks requires a variety of information, such as, for example, QoS measurements, resource measurements (e.g., network utilizations), inventory information, and topology specifications. Collectively, we refer to these information sources as data. Much of this data is dynamic. Indeed, measurement data changes with each collection interval. Further, in large networks, topology and inventory information change frequently due to device failures and changes made by network administrators.

We use the term "dataset" to describe a collection of data within the same structure. For example, a dataset might be organized as a relational table that is structured so that each row has the same columns. Here the data is structured into rows such that each row has a value for every column. A dataset contains multiple "data elements" (hereinafter, just elements), which are instances of data structured in the manner prescribed by the dataset (e.g., a row in a relational table). A group of elements within the dataset is called an "element collection." An element collection is specified by a "collection descriptor" (e.g., SQL where-clause for a relational table or line numbers for a sequential file). A collection descriptor consists of zero or more "constraints" that describe an element collection. A constraint consists of an "attribute" (e.g., a column name in a relational table or a field in a variable-length record), a relational operator (e.g., =, <, >), and a value.

Due to the diversity of software tools, administrative requirements, and other factors, data is typically grouped into multiple datasets. Thus, decision support often requires navigating from an element collection in one dataset to one or more element collections in other datasets. We refer to these as the "source element collection," "source dataset," "target element collections" and "target datasets," respectively.

With this background, we state one of the problems addressed by the present invention. We are given a source element collection and multiple target datasets. The objective is to find the target element collection that "best matches" the source element collection. By best matches, it is meant that the structure and content of the source element collection is the most similar to that of the target element collection.

To illustrate the problem addressed, we describe a scenario in QoS management. Considered is a situation in which end-users experience poor quality of service as quantified by long response times. The objective is to characterize the cause of long response times by: (i) when they occur; (ii) who is affected; (iii) which configuration elements are involved; and (iv) what components of the configuration element account for most of the delays.

The analyst starts with a dataset containing end-to-end response times. The dataset is structured into the following columns: shift, hour, subnet, host, user's division, user's department, user name, transaction issued, and response time. The analyst proceeds as follows:

Step 1. The analyst isolates the performance problem. This may be done in any conventional manner, such as, for example, is described in R. F. Berry and J. L. Hellerstein, "A Flexible and Scalable Approach to Navigating Measurement Data in Performance Management Applications," Second IEEE Conference on Systems Management, Toronto, Canada, June, 1996. In the example, isolation determines that poor response times are localized to the element collection described by the constraints: shift=1, hour=8, subnet=9.2.15, division=25, department=MVXD, user=ABC, and transaction=_XX. At this point, the analyst has characterized when the problem occurs, who is affected, and which configuration elements are involved.

Step 2. To determine what components of the configuration element account for most of the delays, the analyst must examine one or more other datasets. After some deliberation and investigation by the analyst, the analyst selects a dataset of operating system (OS) measurements that are structured as follows: hour, minute, shift, subnet, division, department, efficiency, waiting time, CPU waits, I/O waits, page waits, and CPU execution times.

Step 3. The analyst selects the subset of the OS data that best corresponds to the response time data. Doing so requires dealing with two issues: (i) the source and target datasets are structured somewhat differently in that the first has transaction information (which the second does not), and the second reports time in minutes (which the first does not); and (ii) the second dataset does not have records for user ABC, the user for which a problem was isolated. To resolve the first problem, the analyst decides to use only the information common to both datasets. So, transaction information and minutes are ignored when navigating from the response time data to the OS data. The second problem is resolved by assuming that users within the same department are doing similar kinds of work. Thus, the target element collection is described by the constraints: shift=1, hour=8, subnet=9.2.15, department=MVXD, and user=ABC.

Step 4. The analyst uses the OS data to characterize the host component that contributes the most to response time problems. This characterization reveals that paging delays account for a large fraction of end-to-end response times.

Steps 1 and 4 employ similar problem isolation logic. Indeed, automation exists for these steps. Unfortunately, in the prior art, steps 2 and 3 are performed manually. As such, these steps impede the automation, accuracy and comprehensiveness of problem isolation. This, in turn, significantly increases management costs. The challenges raised by steps 2 and 3 above are modest if there are a small number of measurement sources. Unfortunately, the number of measurement sources is large and growing.

Disimilarities in the structure of datasets typically arise because measurements are specific to the measured entity. Hence, heterogeneous equipment means heterogeneous measurement sources. Heterogeneity includes the different types of devices (e.g., routers versus file servers), different vendors, and different versions of the same product from the same vendor. With rapid changes in information technology, acquisition cycles are now much longer than technology cycles. For example, depreciation times for personal computers are typically 3 to 5 years, but the technology changes every 9 to 12 months. Further, customers typically upgrade hardware and software in an incremental fashion. The combination of these factors means that customers have an increasingly diverse collection of hardware and software. As such, the diversity of measurement sources is rapidly increasing.

One proposed way to attempt to avoid the problem of heterogeneous measurement sources is to build a data warehouse that integrates data with dissimilar structure, as described in R. Kimbell, "The Data Warehouse Toolkit," John Wiley and Sons, 1996. This is accomplished by employing tools that translate data formats and semantics into a common structure. Such an approach works well for fairly static data that is analyzed frequently in that the cost of building and maintaining the data warehouse is amortized over a long time window and a large number of data accesses. However, in systems management applications, the data is dynamic, such as QoS measurements that change every minute. Also, the detailed data used for solving QoS problems is only needed when a problem arises. Thus, the cost of building and maintaining the data warehouse far outweighs the benefits provided.

Existing art for navigating between datasets is specific to the manner in which the data is organized, that is, the conceptual model employed. We consider three such conceptual models: relational data (with variations), multidimensional databases (MDDB), and text documents. While other organizations may exist (e.g., graphical structures, such as hyper linked documents), similar issues arise in these organizations as well.

Considered first is data organized as relational tables. Here, a dataset is a table, an element is a row in a table, and a collection descriptor is an SQL where-clause. Navigation between datasets is accomplished through SQL queries that use the join operation. A join requires specifying the table to navigate to (e.g., in the from clause of SQL queries) and the join attributes used in the where clause. However, often times situations exist in which neither the table to navigate to nor the choice of join attributes are known. Thus, while it may be useful to employ join operations in an attempt to achieve automated navigation, the join operation itself does not solve the existing problems.

Considered next is data organized as MDDB, as described in R. F. Berry and J. L. Hellerstein, "A Flexible and Scalable Approach to Navigating Measurement Data in Performance Management Applications," Second IEEE Conference on Systems Management, Toronto, Canada, June, 1996. Conceptually, such an organization can be viewed as a layer on top of the relational model. The MDDB structures attributes into dimensions. Within a dimension, attributes may be further structured into a directed acyclic graph (DAG). Here, a dataset is a cube (a MDDB schema along with its base data), an element is a cell within a cube, and a collection descriptor is a where clause that abides by the hierarchical structure imposed by the MDDB. In the example above, there might be dimensions for Time, Configuration Element, Workload and Metric. In the source dataset, the Workload dimension may contain the attributes division, department, user, and transaction, ordered in this manner. Thus, the coordinate for this dimension would be division=25, department=MVXD, user=ABC, and transaction=_XX.

Navigation within a multidimensional database is accomplished by drill-down and drill-up operations. Drill-down adds constraints in one or more dimensions such that the attribute of the constraint is at the next lower level in the dimension's DAG. Drill-up is the inverse operation. It removes constraints in one or more dimensions. The attributes of the constraints removed are at the next higher level in the dimension hierarchies. For example, consider the constraints for the Workload dimension: division=25, department=MVXD, user=ABC, and transaction=_XX. Drill-up yields the constraints division=25, department= MVXD, and user=ABC.

Navigation between cubes can be accomplished in many ways. One approach is to use SQL queries, as described in R. Kimbell, "The Data Warehouse Toolkit," John Wiley and Sons, 1996. However, this suffers from the same drawbacks as described above.

Another approach to automated navigation between cubes is to employ a drill-through operation. With drill-through, a source cell is associated with one or more target cells. This is either done by specifying an explicit association or by specifying a program that computes the association dynamically. The former is poorly suited to dynamic environments in which new cubes are added and others are deleted or their structure is modified. The latter provides a mechanism for dealing with these dynamics, but in and of itself, providing programmatic control does not solve the problems associated with determining which target data to navigate to.

A third way of organizing data is as text documents. Here, the navigation is from keywords (e.g., as specified in an Internet search engine) or whole documents to other documents. This is accomplished by preprocessing the documents to extract keywords (and keyword sequences) to provide an index. Such an approach works well for fairly static data since the index structures are computed infrequently. However, it works poorly for dynamic data.

Further, it is known that data structured as comma-separated-values (or other separators) can readily be treated as relationally structured data. This is accomplished by: (a) describing each column in terms of the distribution of its element values, and (b) using a similarity metric to find comparable columns in other datasets.

Still further, existing art on federated and multidatabase systems, as described in M. T. Ozsu and P. Valduriez, "Principles of Distributed Database Systems," Prentice Hall, 1991, as well as schema integration, as described in J. A. Larson, S. B. Navathe, R. Elmasri, "A Theory of Attribute Equivalence in Databases with Application to Schema Integration," IEEE Transactions on Software Engineering, vol. 15, no. 4, April 1989, teaches how to address problems with heterogeneous names and semantics of columns in relational databases. These approaches allow for performing SQL queries in which the tables referenced in the from clause may have different relational schema. However, these approaches do not teach how to automate the selection of relational tables to use in the from clause, nor do they address how to determine the target element collection that is closest to the source element collection.

SUMMARY OF THE INVENTION

The present invention provides systems and methods that aid in decision support applications by automatically selecting data relevant to an analysis. This is accomplished by using the structure of the source dataset in combination with the content of the source element collection to identify the closest element collections within one or more target datasets.

Particularly, the invention is implemented in a form which includes certain functional components. These components, as will be explained, may be implemented as one or more software modules on one or more computer systems. A first component is referred to as an inter-dataset navigation engine (IDNE). The IDNE is invoked by analysis applications to automate the selection of related data. The IDNE makes use of another component referred to as dataset access services. The dataset access services component knows the accessible datasets and their structures, creates and manipulates collection descriptors, and provides access to elements within a dataset that are specified by a collection descriptor.

In one embodiment, automated navigation according to the invention may be accomplished in the following manner. First, the IDNE iterates across all target datasets to do the following: (a) use the structure of the source and target datasets to transform the source collection descriptor into a preliminary collection descriptor for the subset of the target dataset that is closest to the source element collection; (b) construct the final collection descriptor by transforming the preliminary collection descriptor until it specifies a non-null subset of the target dataset; and (c) compute a distance metric representing how close the source element collection (or collection descriptor) is to the target element collection (or collection descriptor). The IDNE then returns a list of triples including a name of the target dataset, a target collection descriptor, and a value of the distance metric for each target dataset.

The list may be presented to an end-user who then selects the preferred target dataset. Alternatively, the list may be provided to a program that does additional processing. The list may be sorted by descending value of the distance metric so as to provide a ranking of the target datasets and their target element collections.

It is to be appreciated that the systems and methodology of the present invention advantageously eliminate the drawbacks (e.g., accuracy, comprehensiveness, etc.) that exist in the manual navigation approach and other prior art approaches described above. To illustrate the operation of this methodology, we apply it in the context of the previously presented exemplary scenario. Recall that the collection descriptor of the elements in the source dataset is: shift=1, hour=8, subnet=9.2.15, division=25, department=MVXD, user=ABC, and transaction=__XX. We also use the operating system (OS) data previously introduced. This data is structured into the following columns: shift, hour, minute, subnet, division, department, efficiency, waiting time, CPU waits, I/O waits, page waits, and CPU execution times.

The invention performs steps (a) through (c) above as follows. A preliminary collection descriptor is constructed for the OS data by transforming the source collection descriptor (step (a)). In particular, the constraints such as transaction=__XX that have an attribute that is not present in the target dataset are addressed. One approach to resolving this is to remove such constraints. Doing so yields: shift=1, hour=8, subnet=9.2.15, division=25, department=MVXD, and user=ABC.

Next, the final collection descriptor in the target dataset is constructed (step (b)). This can be achieved by doing the following. First, the element collection specified by the preliminary collection descriptor is retrieved. If this collection is empty, one or more constraints from the collection descriptor are removed. This is repeated until a non-null element collection is obtained. In the exemplary scenario, there is no data for user ABC. So, the constraint user=ABC is removed. Thus, the final target collection descriptor is shift=1, hour=8, subnet=9.2.15, division=25, and department=MVXD.

Lastly, the metric for the distance between the source and target element collections is computed (step (c)). Note that in the above construction, the target collection descriptor always has a subset of the constraints in the source collection descriptor. Thus, a convenient distance metric is the difference between the number of constraints in the source and target collection descriptors. In the exemplary scenario, this value is two.

Accordingly, the present invention provides automation for selecting datasets relevant to analysis tasks. Such automation is crucial to improving the productivity of decision support in systems management applications. The automation enabled by the invention provides value in many ways. For example, the invention makes the novice analyst more expert by providing a list of target datasets and collection descriptors that are closest to an element collection at hand (i.e., the source element collection). As a result, the novice focuses on the datasets that are most likely to be of interest in the analysis task. By way of further example, the invention makes expert analysis more productive. This is achieved by providing the target collection descriptor for each target dataset thereby enabling the construction of a system in which analysts need only click on a target dataset (or collection descriptor) in order to navigate to its associated element collection.

The techniques employed today for dataset selection (e.g., drill-through in MDDBs) embed fixed associations between datasets or require special purpose programs that must be maintained if datasets and/or attributes are added or deleted. In contrast, the invention uses the structure of the data itself to select relevant data. Such an approach adapts automatically to changes in the structure and content of the data being analyzed.

In another embodiment of the invention, the set of attributes considered when transforming the source collection descriptor into the target collection descriptor may be constrained. Indeed, the exemplary scenario does not consider the attributes response time, efficiency, waiting time, CPU waits, I/O waits, page waits, and CPU execution time.

In yet another embodiment of the invention, different levels of importance may be assigned to attributes. For example, a match on the attribute subnet may be considered more important than a match on the attribute division. This may be implemented by changing the manner in which the distance metric is computed so that it includes weights assigned. In this way, differences in the values of more important attributes result in larger distances than do differences in less important attributes.

Automated navigation according to the invention can be applied in many domains. For example, in analysis of manufacturing lines, measurement datasets exist for machines in the manufacturing line as well as for the interconnection of these machines. Automated navigation according to the invention can aid with decision support for scheduling and planning based on this data. By way of a further example, in transportation systems, datasets exist for measurements taken by road sensors and traffic reports. Automated navigation according to the invention can aid in planning highway capacity over the entire network of roadways. It is to be understood that the above applications are merely exemplary in nature and not intended to limit the applicability of the invention. Furthermore, it is to be appreciated that automated navigation according to the invention can be accomplished centrally at a server or in a distributed manner amongst several smaller server machines.

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 1A is a block diagram illustrating a system for implementing an automated navigation system according to an exemplary embodiment of the invention;

FIG. 1B is a block diagram illustrating a hardware implementation for both an end-user computer system and an analysis server computer system according to the invention;

DETAILED DESCRIPTION OF PREFERRED EMBODIMENTS

Figure 2:
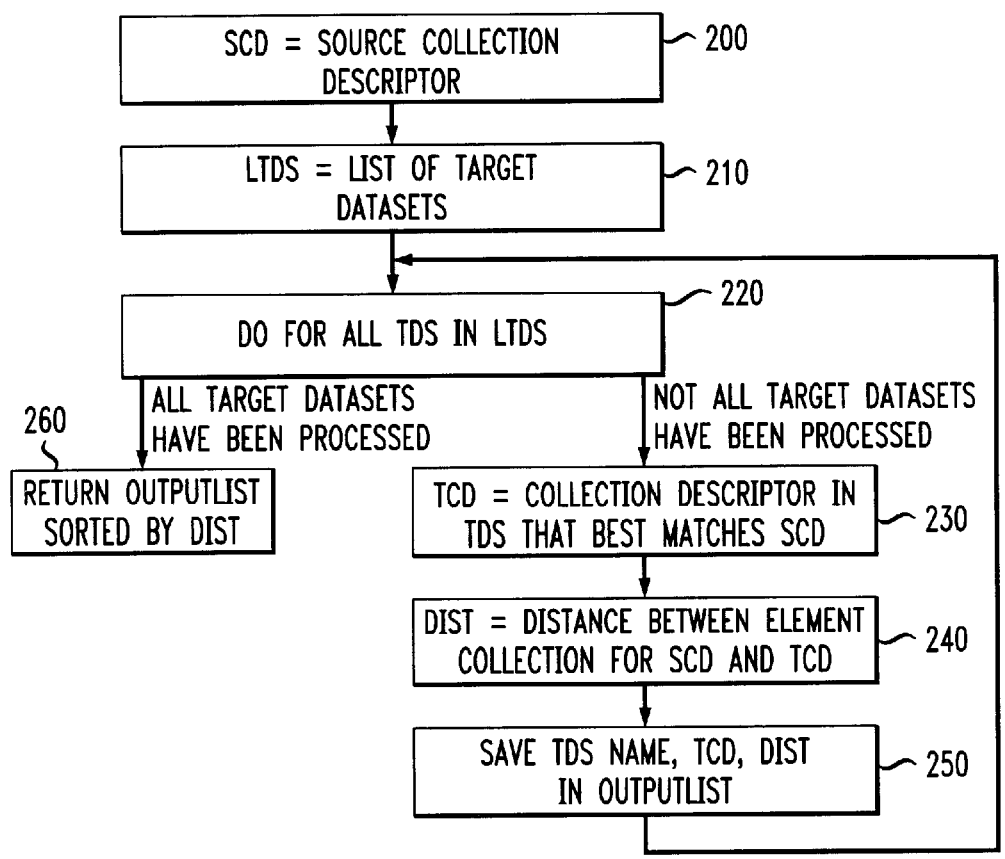
FIG. 2 is a flow diagram illustrating an automated navigation method according to an exemplary embodiment of the invention.

It is to be appreciated that the term "processor" as used herein is intended to include any processing device, such as, for example, one that includes a CPU (central processing unit). The term "memory" as used herein is intended to include memory associated with a processor or CPU, such as, for example, RAM, ROM, a fixed memory device (e.g., hard drive), a removable memory device (e.g., diskette), etc. In addition, the term "input/output devices" or "I/O devices" as used herein is intended to include, for example, one or more input devices, e.g., keyboard, for inputting data to the processing unit, and/or one or more output devices, e.g., CRT display and/or printer, for providing results associated with the processing unit. It is also to be understood that various elements associated with a processor may be shared by other processors. Accordingly, software components including instructions or code for performing the methodologies of the invention, as described herein, may be stored in one or more of the associated memory devices (e.g., ROM, fixed or removable memory) and, when ready to be utilized, loaded in part or in whole (e.g., into RAM) and executed by a CPU.

Referring to FIG. 1A, a block diagram is shown of a system for implementing an automated navigation system according to an exemplary embodiment of the invention. As shown, an end-user computer system 102 is coupled to one or more analysis server computer systems 104-1 through 104-K. Each analysis server includes one or more analysis applications 110-1 through 110-N with which the end-user computer system interfaces. The analysis applications are analysis programs relating to various applications for which analysis of datasets is required, e.g., manufacturing lines, transportation systems, etc. The analysis applications use a service interface component 120 to access datasets associated with a dataset access service component 130. The analysis applications also use the service interface component 120 to access the services of an inter-dataset navigation engine (IDNE) 140. It is to be appreciated that the services interface component 120 is employed as an interface between the analysis applications and the dataset access service component 130 and the IDNE 140 since the various analysis applications may have different communication formats. In this manner, the dataset access service component and the IDNE do not have to handle a large variety of communication formats when communicating with the analysis applications, but rather, they communicate with the services interface 120 which preferably converts the various formats to a single format understood by the dataset access service and IDNE. The services interface component 120 may also serve as a buffer for the dataset access service and the IDNE. The particular implementation of the services interface component is not critical to the invention since, given the design choices for the communication formats of the analysis applications, the dataset access engine and the IDNE, implementation of the interface is a matter of programming choice within the skill level of the ordinary artisan.

The IDNE 140, as will be explained in detail below, provides automation for selecting target element collections that are close to a source element collection. To accomplish this, the IDNE has access to an externally specified description of attribute weights 145 that provides a means to associate a positive value with each attribute of every dataset accessed through a dataset access engine 150. The IDNE makes use of the dataset access service 130. Within the dataset access service 130 is the dataset access engine 150 and one or more datasets 160-1 through 160-M. It is to be appreciated that the dataset access engine 150 may be implemented in many ways. For data that is organized as relational tables, engine 150 is implemented as a relational database engine. For data that is organized as a multidimensional database, engine 150 is implemented as a MDDB engine. Further, the dataset access engine 150 may be a combination of several conventionally available data access engines. The engine and its datasets may be local to a single computer or may be distributed across a plurality of computers, e.g., using a client-server protocol.

Referring now to FIG. 1B, a block diagram is shown of a hardware implementation for both an end-user computer system 102 and an analysis server computer system (e.g., 104-1 through 104-K) for implementing the invention. Each computer system includes a processor 170 coupled to a memory 180 and I/O device(s) 190. In the case of an analysis server, the processor 170 performs the functions associated with the various components running therein. The memory 180 is used by the processor for performing such functions and for storing the datasets and results of the processes. The I/O devices may include one or more data input devices (e.g., keyboard, etc.) for inputting data, if needed, and/or one or more data output devices (e.g., display) for presenting a user with results associated with the functions performed in accordance with the various components. For example, a display may present a user with a graphical user interface for viewing such results. As indicated, both the end-user computer system and analysis computer system may have such a hardware architecture. Also, it is to be appreciated that each analysis server may be in communication with the end-user and each other analysis server via conventional communication links, e.g., local area network, wide area network, etc. Further, as mentioned, more than one computer system may be employed to implement the components illustrated in any one analysis server.

Referring to FIG. 2, a flow diagram is shown of an automated navigation method according to an exemplary embodiment of the invention. It assumed that a user (e.g.,. analyst) at the end-user computer system 102 calls upon at least one of the analysis application programs (110-1 through 110-N) running on at least one of the analysis servers (104-1 through 104-K) to assist in a particular analysis task, e.g., the long response time example detailed above. In such, case, the analysis application communicates with the IDNE 140 and dataset access services 130 such that these components can provide the user with automated navigation between datasets containing dynamic data and having dissimilar structures in order to complete the particular analysis task.

Accordingly, in step 200, the IDNE is provided with a source collection descriptor (SCD) from an analysis application. The source collection descriptor may have been identified by the user at the end-user system or generated by the analysis application. Similarly, in step 210, the IDNE is provided with a list of target datasets (LTDS) from an analysis application. Again, these may also be specified by the user or the analysis application. The IDNE then obtains the listed target datasets from the dataset access engine 150. It is to be understood that the dataset access engine 150 retrieves these datasets from the appropriate memory locations where such datasets are stored. Then, in step 220, the IDNE considers each target dataset within this list in turn. TDS denotes a target dataset in the LTDS. In step 230, a collection descriptor in TDS is obtained such that the collection descriptor is closest to (best matches) the SCD input to the IDNE in step 200. In step 240, the IDNE computes the distance (DIST) between the source and target element collections. Then, in step 250, the name of the target dataset, the target collection descriptor, and the computed distance are saved in an OUTPUTLIST.

The method then returns to step 220 where it is determined whether all the target datasets have been processed. If they have not, then steps 230, 240 and 250 are repeated for each TDS in turn. If all TDSs have been processed, the IDNE proceeds to step 260. In step 260, OUTPUTLIST which contains the triplet set of information for each TDS processed is sorted by DIST. That is, each target collection descriptor generated may be ranked in a list with the target collection descriptor resulting in the smallest distance metric with respect to the source collection descriptor appearing at the top of the list and target collection descriptors resulting in increasingly larger distance metrics with respect to the source collection descriptor appearing correspondingly lower in the list. The OUTPUTLIST is then returned by the IDNE to the analysis application, which then provides the list to the end-user 102 for display to the user.

Figure 3:
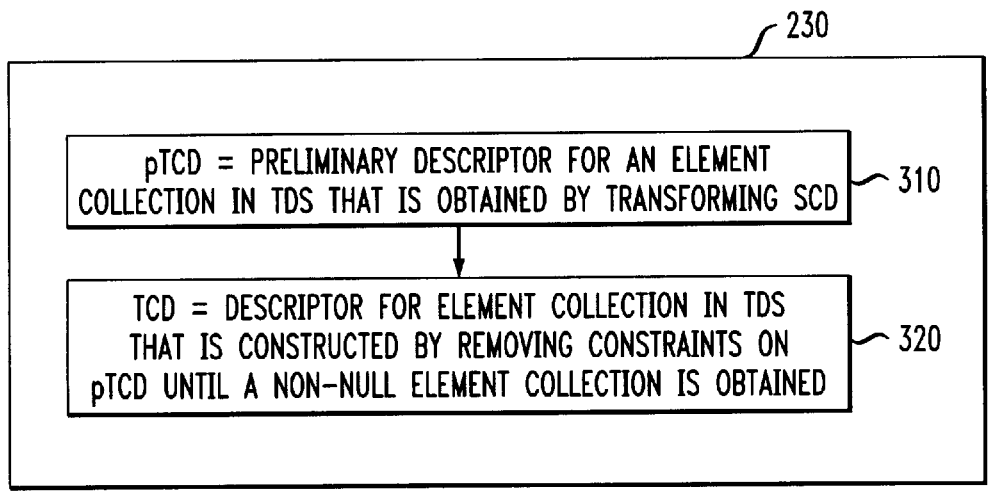
FIG. 3 is a flow diagram illustrating a technique for computing a target collection descriptor that best matches a source collection descriptor according to an exemplary embodiment of the invention.

Referring now to FIG. 3, an exemplary technique is shown for computing a target collection descriptor that best matches a source collection descriptor, e.g., step 230 of FIG. 2. In step 310, a preliminary target collection descriptor (PTCD) is constructed for the current target dataset being considered by appropriately transforming the source collection descriptor. For datasets organized as relational tables, this can be accomplished in the manner specified by the following pseudo-code:

```
pTCD = Default collection descriptor for TDS
Do for each constraint in SCD (which is the SQL where
   clause used in the SCD)
   If the attribute of the constraint is in the schema of TDS
      add the constraint to pTCD
End
```

For datasets organized as multidimensional databases, step 310 may be accomplished in the manner specified by the following pseudo-code:

```
Do for each dimension sd in the source dataset
   td = dimension in TDS that's closest to sd
   (e.g., most attributes in common)
   scv = vector of SCD constraints for dimension sd
   tcv = vector of constraints in scv for which the
   attributes are in TDS
   Set dimension td of pTCD to tcv
End
```

In step 320, the final target collection descriptor is computed. For relationally organized data, this can be accomplished in the manner specified by the following pseudo-code:

```
TCD = pTCD
Do until the element collection specified by TCD is empty
   For each constraint in TCD
      TCD' = TCD – {constraint}
      If the element collection of TCD' is not empty
         TCD = TCD'
         Leave the do-loop
      Endif
   End
   Choose a constraint in TCD and delete it
End
```

This code removes constraints from the preliminary collection descriptor until a non-empty element collection is obtained. To perform step 320 for data organized into a multidimensional database, the following pseudo-code may be employed:

```
TCD = pTCD
Do until the element collection specified by TCD is not empty
   For each dimension td in TCD
```

```
            -continued

TCD' = drill-up of TCD
    If the element collection of TCD' is not empty
       TCD = TCD'
       Leave the do-loop
    Endif
  End
  TCD = drill-up on all dimensions of TCD
End
```

Here, constraints are removed in a manner that preserves the multidimensional structure of the data by performing drill-ups on dimensions until a non-null element collection is obtained.

Figures 4, 5:
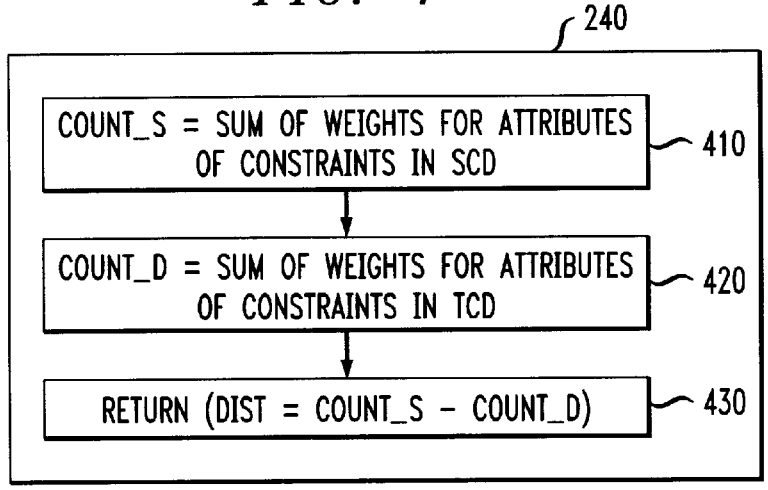
FIG. 4 is a flow diagram illustrating a technique for computing a distance metric according to an exemplary embodiment of the invention.
FIG. 5 is a diagram illustrating a graphical user interface for presenting exemplary results associated with automatic navigation according to an exemplary embodiment of the invention.

Referring now to FIG. 4, an exemplary technique is shown for computing a distance metric between a source element collection and a target element collection, e.g., step 240 of FIG. 2. In step 410, the set of constraints in the source collection descriptor (Count_S) is determined, and the weights of associated attributes (as specified in 145 of FIG. 1A) are added. Similarly, in step 420, the set of constraints in the target collection descriptor 20 (Count_D) is determined, and the weights of associated attributes (as specified in 145 of FIG. 1A) are added. Then, in step 430, the difference between the two numbers is computed as the distance metric DIST. Also, it is to be appreciated that the distance metric may alternatively represent a difference in the respective number of constraints in the source collection descriptor and the target collection descriptor.

Thus, as mentioned above, constraints may be assigned weights such that a particular constraint is considered more important than another constraint. For instance, if it is determined that constraint A is more important than constraint B, then constraint A is assigned a larger weighting value than constraint B. Then, during respective computations of distance metrics between a source collection descriptor containing constraints A and B and a first target collection descriptor differing only by the absence of constraint A and a second target collection descriptor differing only by the absence of constraint B, the distance metric for the first target collection descriptor will be larger than the distance metric for the second target collection descriptor. This is due to the heavier weighting, that is, greater importance, of constraint A. Therefore, a target collection descriptor that contains constraint A but not constraint B is considered a better match with the source collection descriptor containing constraints A and B than a target collection descriptor that contains constraint B but not constraint A.

Referring to FIG. 5, an example is shown of a graphical user interface 500 that displays the results produced by the invention. It is to be appreciated that this is preferably presented to the user (e.g., analyst) on a display associated with the end-user system 102. The information presented includes the dataset name (e.g., MVS Monitor 3, UNIX Accounting, Financials, etc.), the target collection descriptor formed for each target dataset considered, and the value of the distance metric computed for each target collection descriptor. Note that the list is sorted in descending order by value of the distance metric. Doing so helps the user to select the target collection descriptor and dataset that are most appropriate for the analysis at hand.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method of automating navigation between data with dissimilar structures including a source dataset containing one or more data elements and at least one target dataset containing one or more data elements, the method comprising the steps of:

determining at least one collection of data elements from the at least one target dataset that best matches a collection of data elements from the source dataset based on structures associated with the source dataset and the target dataset; and computing at least one distance metric between the at least one target collection and the source collection such that a user can select the at least one target collection given the at least one computed distance metric.

2. The method of claim 1, wherein there is a plurality of target datasets from which respective best matching target collections are determined and respective distance metrics are computed such that the computed distance metrics are presented to the user in a ranked order.

3. The method of claim 2, wherein the presenting step further includes presenting the respective target collection to the user along with the respective computed distance metric.

4. The method of claim 3, wherein the presenting step further includes presenting a respective name associated with the target dataset to the user along with the respective target collection and the computed distance metric.

5. The method of claim 1, wherein the source collection of data elements is specified by a source collection descriptor and the at least one target collection of data elements is specified by a target collection descriptor.

6. The method of claim 5, wherein the data is organized in a relational database and further wherein the determining step includes deleting at least one attribute associated with the target collection descriptor that is not present in the source collection descriptor.

7. The method of claim 5, wherein the data is organized in a multidimensional database and further wherein the determining step includes performing at least one drill-up operation on the target collection descriptor.

8. The method of claim 1, wherein the determining step further includes the steps of:

generating at least one preliminary target collection descriptor associated with the at least one target collection by transforming a source collection descriptor associated with the source collection; and removing constraints associated with the at least one preliminary target collection descriptor until a non-null element collection is obtained.

9. The method of claim 1, wherein the source collection of data elements is specified by a source collection descriptor and the at least one target collection of data elements is specified by a target collection descriptor and further wherein the computing step includes calculating the difference between constraints in the source collection descriptor and the target collection descriptor to compute the distance metric.

10. The method of claim 9, wherein attributes of the constraints are weighted in accordance with their importance.

11. The method of claim 10, wherein the distance metric is proportionally larger when the source and target collection descriptors differ by an attribute of a constraint that has a heavier weight associated therewith.

12. Apparatus for automating navigation between data with dissimilar structures including a source dataset containing one or more data elements and at least one target dataset containing one or more data elements, the apparatus comprising:

at least one processor operable to determine at least one collection of data elements from the at least one target dataset that best matches a collection of data elements from the source dataset based on structures associated with the source dataset and the target dataset, and to compute at least one distance metric between the at least one target collection and the source collection such that a user can select the at least one target collection given the at least one computed distance metric; and a memory coupled to the at least one processor for storing the at least one target dataset.

13. The apparatus of claim 12, wherein there is a plurality of target datasets from which respective best matching target collections are determined and respective distance metrics are computed such that the computed distance metrics are presented to the user in a ranked order.

14. The apparatus of claim 13, wherein the at least one processor is further operable to present the respective target collection to the user along with the respective computed distance metric.

15. The apparatus of claim 14, wherein the at least one processor is further operable to present a respective name associated with the target dataset to the user along with the respective target collection and the computed distance metric.

16. The apparatus of claim 12, wherein the source collection of data elements is specified by a source collection descriptor and the at least one target collection of data elements is specified by a target collection descriptor.

17. The apparatus of claim 16, wherein the data is organized in a relational database and further wherein the at least one processor is operable to perform the determining operation by deleting at least one attribute associated with the target collection descriptor that is not present in the source collection descriptor.

18. The apparatus of claim 16, wherein the data is organized in a multidimensional database and further wherein the at least one processor is operable to perform the determining operation by performing at least one drill-up operation on the target collection descriptor.

19. The apparatus of claim 12, wherein the at least one processor is further operable to perform the determining operation by generating at least one preliminary target collection descriptor associated with the at least one target collection by transforming a source collection descriptor associated with the source collection, and removing constraints associated with the at least one preliminary target collection descriptor until a non-null element collection is obtained.

20. The apparatus of claim 12, wherein the source collection of data elements is specified by a source collection descriptor and the at least one target collection of data elements is specified by a target collection descriptor and further wherein the at least one processor is operable to perform the computing operation by calculating the difference between constraints in the source collection descriptor and the target collection descriptor to compute the distance metric.

21. The apparatus of claim 20, wherein attributes of the constraints are weighted in accordance with their importance.

22. The apparatus of claim 21, wherein the distance metric is proportionally larger when the source and target collection descriptors differ by an attribute of a constraint that has a heavier weight associated therewith.

23. An article of manufacture for automating navigation between data with dissimilar structures including a source dataset containing one or more data elements and at least one target dataset containing one or more data elements, comprising a machine readable medium containing one or more programs which when executed implement the steps of:

determining at least one collection of data elements from the at least one target dataset that best matches a collection of data elements from the source dataset based on structures associated with the source dataset and the target dataset; and computing at least one distance metric between the at least one target collection and the source collection such that a user can select the at least one target collection given the at least one computed distance metric.

24. A computer-based method of automatically navigating between data with dissimilar structures including a source dataset containing one or more data elements and a plurality of target datasets respectively containing one or more data elements, the method comprising the steps of:

determining one or more collections of data elements from the plurality of target datasets that best match a collection of data elements from the source dataset, the determination being based on the structures associated with the source dataset and the plurality of target datasets; and computing one or more distance metrics between the one or more target collections and the source collection.

25. The method of claim 24, wherein the determining step further comprises the steps of:

generating one or more preliminary target collection descriptors associated with the one or more target collections by transforming a source collection descriptor associated with the source collection; and removing constraints associated with the one or more preliminary target collection descriptors until a non-null element collection is obtained.

26. Apparatus for automatically navigating between data with dissimilar structures including a source dataset containing one or more data elements and a plurality of target datasets respectively containing one or more data elements, the apparatus comprising:

means for determining one or more collections of data elements from the plurality of target datasets that best match a collection of data elements from the source dataset, the determination being based on the structures associated with the source dataset and the plurality of target datasets; and means for computing one or more distance metrics between the one or more target collections and the source collection.

27. The apparatus of claim 26, wherein the determining means further comprises:

means for generating one or more preliminary target collection descriptors associated with the one or more target collections by transforming a source collection descriptor associated with the source collection; and means for removing constraints associated with the one or more preliminary target collection descriptors until a non-null element collection is obtained.

\* \* \* \* \*

UNITED STATES PATENT AND TRADEMARK OFFICE
CERTIFICATE OF CORRECTION

PATENT NO. : 6,704,721 B1  Page 1 of 1
DATED : March 9, 2004
INVENTOR(S) : Joseph L. Hellerstein It is certified that error appears in the above-identified patent and that said Letters Patent is hereby corrected as shown below:

<u>Title page,</u>
Item [56], References Cited, U.S. PATENT DOCUMENTS, after
"6,636,853 B1 *   10/2003    Stephens, Jr.         707/3", insert the following:
-- 5,446,575   *   6/1991     Lysakowski, Jr.       707/104
   5,724,571   *   7/1995     Woods                 707/5
   5,724,575   *   7/1996     Hoover et al.         707/10
   5,767,854   *   9/1996     Anwar                 345/355
   5,852,819   *   1/1997     Beller                707/1
   5,895,465   *   9/1997     Guha                  707/4
   5,918,232   *   11/1997    Pouschine et al.      707/103
   5,999,937   *   6/1997     Ellard                707/101
   6,108,651   *   2/1999     Guba                  707/4
   6,108,700   *   8/1997     Maccabee et al.       709/224
   6,119,124   *   3/1998     Broder et al.         707/103
   6,128,624   *   11/1997    Papierniak et al.     707/104 --.

Signed and Sealed this

Twenty-third Day of May, 2006

JON W. DUDAS
*Director of the United States Patent and Trademark Office*